United States Patent [19]

Stone

[11] 4,279,321
[45] Jul. 21, 1981

[54] LATCHING SYSTEM FOR A TRUCK CAB
[75] Inventor: Thomas R. Stone, Hayward, Calif.
[73] Assignee: PACCAR Inc, Bellevue, Wash.
[21] Appl. No.: 110,680
[22] Filed: Jan. 9, 1980
[51] Int. Cl.³ .............................................. B62D 27/06
[52] U.S. Cl. ................................ 180/89.14; 292/110; 296/35.1
[58] Field of Search ............... 180/89.14, 89.15, 89.16; 292/110, 201, 64; 296/190, 35.1

[56] References Cited
U.S. PATENT DOCUMENTS

| | | | |
|---|---|---|---|
| 3,581,840 | 6/1971 | Hirst, Jr. ........................... | 180/89.14 |
| 3,797,882 | 3/1974 | Brimhall ............................ | 292/110 |
| 3,825,295 | 7/1974 | Saunders et al. ................. | 180/89.14 |
| 3,841,693 | 10/1974 | Reynolds et al. ................ | 180/89.14 |
| 4,045,063 | 8/1977 | Fletcher et al. .................. | 292/110 |

*Primary Examiner*—Robert R. Song
*Attorney, Agent, or Firm*—Owen, Wickersham & Erickson

[57] ABSTRACT

A mounting and latching system for a cab-over-engine type truck, wherein the cab is pivotal about an axis at the front of the cab and frame, includes mounting devices at the left and right, at the rear of the cab. Each frame-attached mount has two angled surfaces for receiving complementarily shaped cab-attached mounts and centering the cab's rear on the frame, in normal operation. When the truck frame twists due to unevenness of the surface over which the truck is moving, the cab above remains substantially undeformed with one rear mount continuing to bear against the frame surface and the other separated from the frame. The latching system maintains the cab's rear latch at both mounts even during such movement, by means of a spring biased pivoted hook which is permitted considerable movement. Latching and unlatching, for tilting of the cab, are accomplished via a hydraulic arrangement by which the latching hook is automatically articulated in several directions to cause unlatching and swinging away of the hook so that the cab rear can be lifted. The hydraulics of the latch are preferably tied into a hydraulic cab tilt system, so that when hydraulic pressure is applied by the operator, the latches first disengage, then the cab lifts, and the reverse when the cab is lowered back to the frame.

13 Claims, 9 Drawing Figures

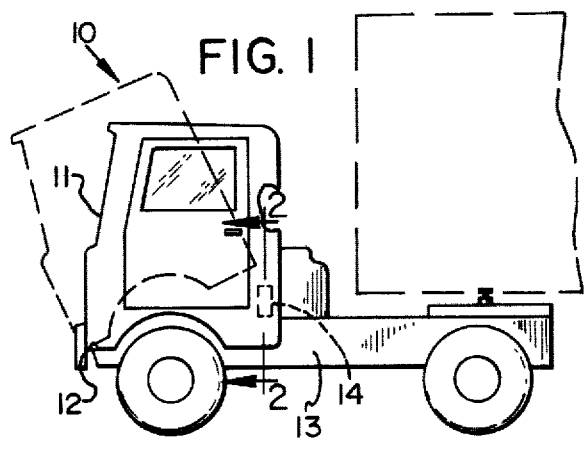
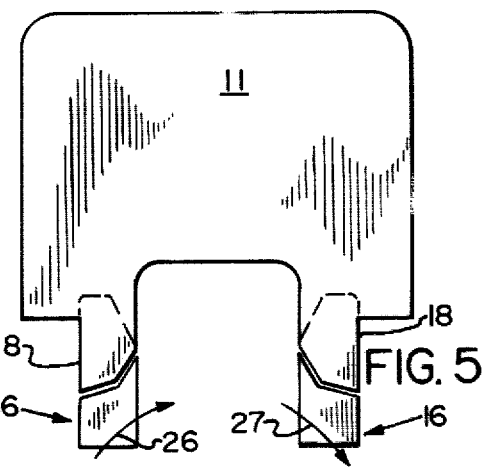
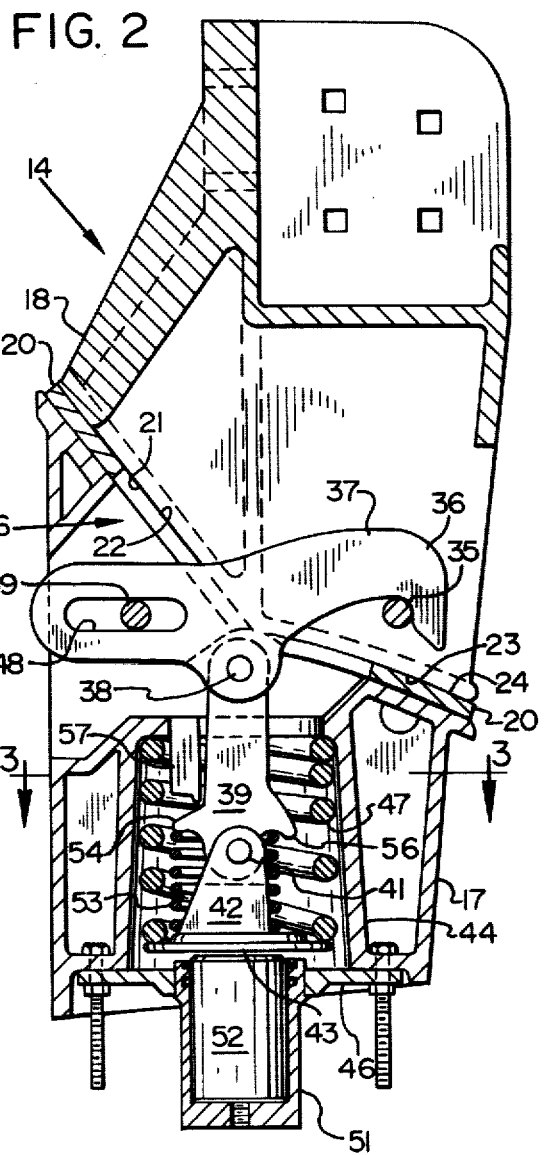
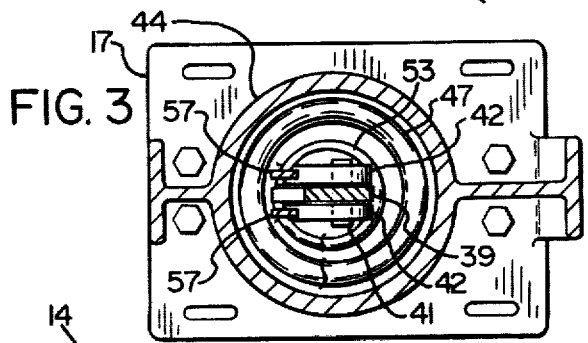
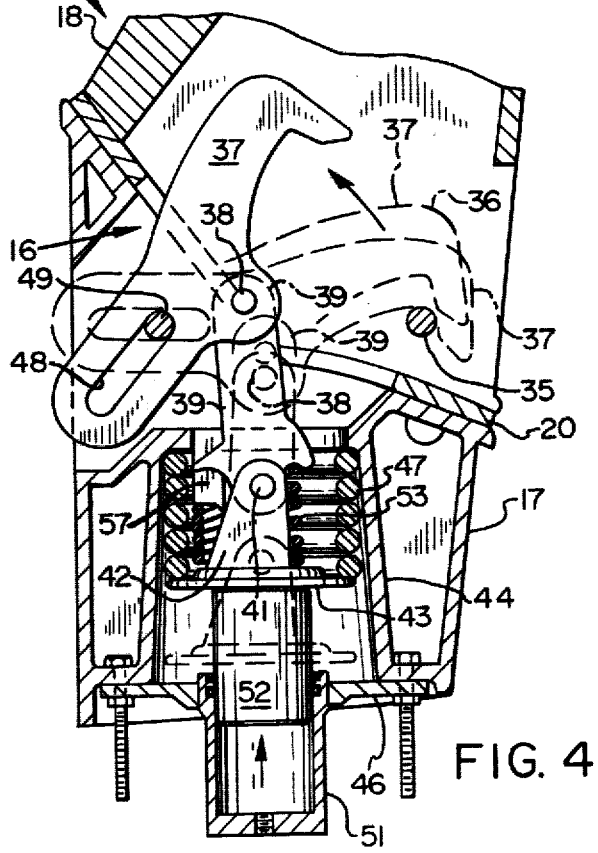

LATCHING SYSTEM FOR A TRUCK CAB

BACKGROUND OF THE INVENTION

The invention relates to tilting cab-over-engine type truck cabs, and more particularly to an improved rear mount and latching system for a tilt cab.

In the design of motor vehicles, passenger cars generally are provided with frames which are very rigid, while most trucks usually have limber frames which can give to some extent with the irregularity of the surface over which they are driven. Cab-over-engine, tilting cab trucks almost always have a limber chassis, and this can present special problems. The cab itself, which is essentially a thin sheet metal box, is relatively rigid. Twisting of the frame, as when the truck is driven angularly onto an incline, or pulled off the side of the road or in any similar situation, affects the cab and would damage the cab if the cab were fixedly secured to the frame at all four points. The tilt cab of course pivots about a front axis usually located just above the front bumper. At the rear, where latching is necessary, manufacturers have utilized some type of spring-loaded device to provide for a degree of up/down travel at each rear latch. A typical design might provide about 1½ inch of travel, via the flexibility of a coil spring.

The limited degree of travel for the rear mounts provided by such prior arrangements has not been sufficient to accommodate the degree of frame twisting that normally occurs in a tractor truck. Also, these arrangements have failed to accommodate the total motion of the frame with respect to the cab, which is a great deal more than simple up-and-down movement. The motion is actually a combination of side-to-side and rocking movement. The shape of the mounts and their receiving surfaces, also, have not been adequate to accommodate the rocking and side-to-side movement while at the same time serving to center the truck cab rear under normal operating circumstances.

U.S. Pat. No. 3,825,295, assigned to the assignee of the present invention, discloses a cab rear mount and latch mechanism wherein, at each side, a cradle is provided on the frame, with a flat bottom and outwardly extending arms. The cradle receives a complimentary shaped cab mount member which is designed to rest against the two angled arms of the cradle. Co-operating with this mount arrangement, as disclosed in the patent, is a latching assembly which provides for a degree of travel principally in the up and down direction, with automatic releasing of the latches on the initial pressurization of the hydraulic system which lifts the cab on its tilt axis. While the system of this patent has performed satisfactorily, and while the present invention is based in part upon the latching mechanism of the patent, there has been a need for a mount and latch system which permits a greater degree of rocking and side-to-side movement of the cab with respect to the frame (or vice versa). Cradles having two arms tend to restrain the relative motion of the cab and frame, particularly since downward and outboard movement of the cab mount is prohibited. High stresses have often developed in the cab with such systems. Occasionally, one of the arms of each cradle has tended to break off because the relative movement has been overly restrained.

There is a theoretical ideal path for relative motion of the cab body with respect to the frame at the rear of the cab during twisting movement of the frame. Such as ideal path is one which keeps the cab free from stresses during frame twisting. If at each cab mount, the cab could be permitted to follow or approximately follow this ideal path during frame twisting, with a latching mechanism which still securely holds the mounts to the frame, cab stresses could be virtually eliminated without hindering the normal twisting of the frame.

It is therefore among the objects of the invention to provide an improved rear cab mounting and latching system for a tilt cab truck wherein cab stresses are virtually eliminated under normally stressful frame twisting conditions by permitting the cab to follow approximately its ideal free-movement path with respect to the frame. Another important and related object is to provide a new type of cab latch which has the safe and automatic latching and unlatching features of U.S. Pat. No. 3,825,295 but which also provides for a great deal more rocking and side-to-side movement of the cab, with respect to the frame. A further related object is to accomplish these goals without complex and expensive mechanical schemes.

SUMMARY OF THE INVENTION

The present invention attains the goals outlined above in part by providing a new type of frame-attached mounting cradle for engagement by the mounts at the rear of the cab. The two cradles, one secured to the frame at each side of the cab rear, function to center the cab when it is lowered onto the frame and during normal operation through use of inclined planes, but without unduly restricting the relative movement which the cab mounts tend to undergo during frame twisting. Each mounting cradle includes only two surfaces, without any barriers to outboard, downward movement of the cab mount. When the relative twisting is such that the cab mount at a particular side tends to move outboard and downward, it is permitted to do so by sliding along a curved surface of the mounting cradle which angles outwardly and slightly downwardly. At the same time, the opposite side of the cab is moving upwardly and inboard with respect to the frame, and this motion is accommodated simply by permitting the mount to ride up away from contact with the mounting cradle.

The latch system of the invention accommodates all this movement, on both sides, by means of a spring, link and hook arrangement which is a modification and improvement of the latch disclosed in U.S. Pat. No. 3,825,295. The arrangement includes a heavy duty spring which normally tends to pull downwardly on a link pivotal from its bottom. A hook member is pivotally connected to the swingable top end of the link, with a slot in the tail end of the hook member fitted over a fixedly secured slider pin on the frame. The hook engages, at its other end, a mount pin connected to the cab mount. Activation of a hydraulic cylinder pushes a piston which compresses the heavy duty spring, causing a helper spring also to compress. Initial movement of the piston causes the link to move up generally vertically, lifting the hook from the mount pin. However, further compression of the spring causes the helper spring to swing the hook member away from the mount pin to a retracted position, permitting the cab to be pivoted upwardly on its tilt axis.

During operation of the truck over uneven surfaces, this same latching assembly permits movement of the cab mount with respect to the frame toward either side, and also up and down, without releasing the restraining force exerted on the cab mount by the heavy duty spring. As in the earlier discussed Pat. No. 3,825,295, the latching system with its hydraulic cylinder is connected into the hydraulic system for tilting the cab, so that initial pressurization of the tilting cylinders is effective, first to release the latches to clear the way for lifting of the cab rear during cab tilt. The latches work in reverse when the cab is lowered back to the frame, so that the hook engages the mount pin only after the mount has returned to its lowered position.

Accordingly, in one embodiment of the invention a rear mounting and latching system for a cab-over-engine truck cab, for enabling relative movement of the cab and the truck frame when the frame twists due to movement of the truck over uneven surfaces, comprises a pair of mounting cradles secured to the frame at the rear of the cab, one at each side. Each mounting cradle has a first surface steeply inclined downwardly in the outboard direction and an adjacent second surface extending generally from the lower end of the first surface in the outboard direction, generally sloping downwardly but at less inclination than the first surface. The system includes a pair of complementarily shaped cab mounts secured to the cab and positioned to engage in the cradles and to center the cab rear when the cab is in its normal position on the frame. Each mount has a first surface positioned to engage the first surface of the cradle and a second surface positioned to engage the second surface of the cradle. For retaining the cab rear to the frame, latching means are provided for urging each mount toward its normal position in the mounting cradle while also permitting side-to-side, upward and tilting motion at each cab mount relative to the frame. By this arrangement, upon twisting of the frame, the cab rear is permitted side-to-side and rocking motion with respect to the frame, with the first surface of one mount sliding outboard on the corresponding first surface of the adjacent mounting cradle and the other mount traveling above and inboard of its normal position, out of contact with the adjacent cradle.

DESCRIPTION OF THE DRAWINGS

FIG. 1 is a schematic side elevational view illustrating a cab-over-engine truck with a tilt cab, and indicating the pivot axis of the cab. Broken lines indicate a partially tilted cab and, at the rear, a fragmentary portion of a trailer.

FIG. 2 is a sectional view showing one side of a rear cab mounting and latching assembly according to the invention, taken generally along the line 2—2 of FIG. 1.

FIG. 3 is a sectional view of the mounting and latching assembly taken along the line 3—3 of FIG. 2.

FIG. 4 is a view similar to FIG. 2, but illustrates the movement of the latching assembly during latching and unlatching. The latch is shown in solid lines in its fully unlatched position and in broken lines in a lower fully latched position and in a barely unlatched position.

FIG. 5 is a schematic view in rear elevation indicating the relative movement of the cab and frame during twisting of the truck's frame.

DESCRIPTION OF A PREFERRED EMBODIMENT

Figure 6:
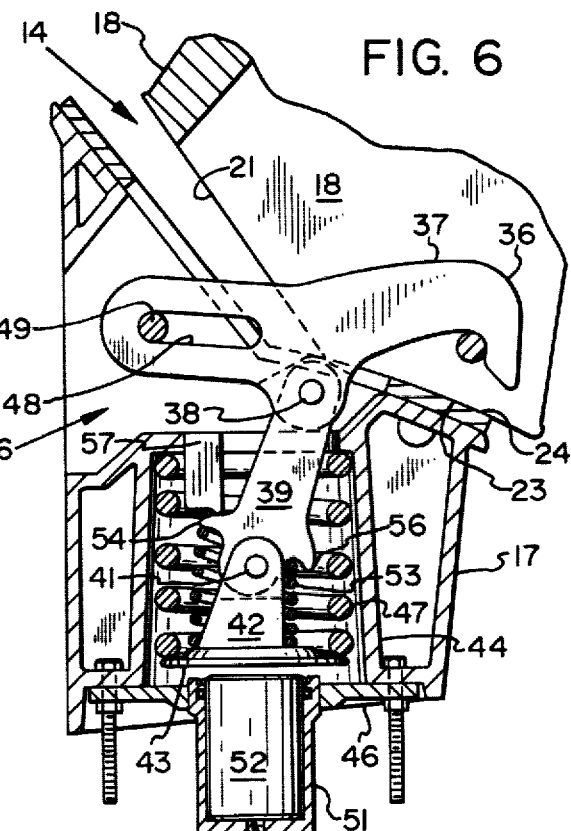
FIG. 6 is a fragmentary sectional view similar to FIG. 2, illustrating the action of the cab mount on one side of the truck as the frame twists.

In the drawings, FIG. 1 shows a cab-over-engine type truck or tractor 10 having a cab 11 which is tiltable forward as indicated in broken lines about a horizontal cab pivot axis 12, with respect to a frame 13 of the truck. FIG. 1 also shows the approximate location of a cab rear mounting and latching mechanism 14 embodying the principles of the invention.

Mounting System

FIG. 2 shows in section the cab rear mounting and latching mechanism 14, looking foward along the line 2—2 of FIG. 1 at the right side mechanism 14. Thus, in FIG. 2, as well as in FIGS. 4, 6, 7 and 8, the right side of the mechanism 14 is outboard, while the left side is inboard. The mounting and latching system comprises, at each side of the cab 11 and frame 13, a mounting cradle 16 which is part of a mount frame 17, which is in turn secured to the truck frame 13, and a complementarily shaped cab mount 18, which is secured to the rear of the cab 11. Each mount 18 includes a first surface 21 which is steeply inclined downwardly in the outboard direction as shown, and positioned to engage a complementary first surface 22 of the mounting cradle 16. Commencing generally at the lower ends of the first surfaces 21 and 22 are complementarily shaped second surfaces 23 and 24 of the mount and mounting cradle respectively. These surfaces are preferably inclined slightly downwardly in the outboard direction as shown, and may be curved as indicated such that the surface 24 of the mounting cradle 16 is convex. The mounting cradle surfaces 22 and 24 preferably are formed by a wear pad 20 of the mounting cradle.

As discussed above, the cab rear mount arrangement of this invention is designed to accommodate twisting of the truck frame 13, such as occurs when the vehicle is driven over an uneven surface—for example, when an inclined driveway is approached from an angle. The movement of the truck frame 13 at the rear of the cab is illustrated schematically in FIG. 5. The movement of the frame 13 at the mounting cradle 16 may be generally as indicated by arrows 26 and 27 in FIG. 5, with the frame 13 shown undergoing generally a clockwise rotation at the rear of the cab 11. This causes the left portion of the frame 13, at the mounting cradle 16, to travel in a slightly arcuate path upward and to the right, while the frame at the opposite side tends to travel downward and to the right with respect to the cab. If the cab were unyieldingly attached to the frame 13 at the mounting devices 16 and 18, this would tend to induce considerable stresses in the box-like cab, which is usually connected along the front pivot axis 12 in an unyielding manner. The mounting devices 16 and 18 are intended to minimize the stresses induced on the cab 11 by permitting a degree of movement between the cab 11 and frame 13, while still confining the movement to a manageable pattern and magnitude, such that the cab 11 can still be securely connected to the frame 13 by latches.

In the discussion and description of the figures that follows, the relative movement between the frame 13, and cab 11 may be discussed as movement of the cab mounts 18, with the frame mounts 16 remaining stationary, even though both the cab and the frame may actually move; however, it is relative movement between the components that is important, and the analysis is the same whichever component is assumed to move.

Figure 9:
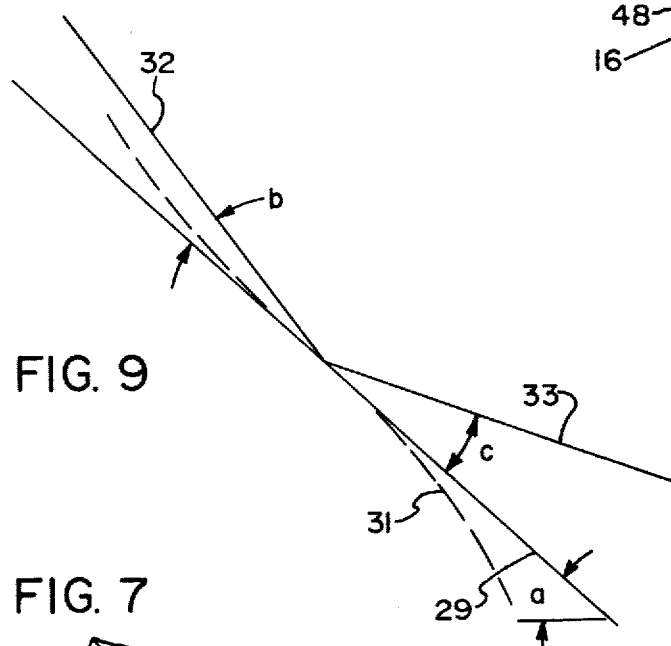
FIG. 9 is a schematic diagram illustrating some of the principles involved in the design of the cab mount system of the invention.

Referring now to FIG. 9, there is illustrated a theoretical "ideal path" 31 for relative movement of the right cab mount 18 with respect to the mounting cradle 16. This curve may be derived either by mathematical modeling of the chassis and cab structure or by empirical measurement; either on a physical model of the vehicle, or on the real vehicle itself. The exact shape of the curve will of course depend on the geometry and stiffness of the chassis and cab. On the vehicle illustrated, a slight S-shape is apparent. This ideal path can be approximated sufficiently for purposes of analysis by a straight line such as the 29 of FIG. 9.

The goal of the design is to permit the mounts 16 and 18 to follow their ideal path of movement to the greatest extent possible, while still providing for adequate support of the cab 11 on the frame 13 and for a tendency of the mounts to center the rear of the cab 11 on the frame 13 when the cab 11 is lowered or to restore the cab 11 to the centered position following its excursion during frame twisting or acceleration effects. The simplest design would give the mounts a single planar mating surface inclined at the ideal angle a as indicated in FIG. 9, with the cab 11 allowed to slide via mating mounts on such a surface. However, there are reasons why this type mount is not desirable. If the angle a is less than the "friction angle" between the mating surfaces, i.e. the minimum angle which would permit sliding movement of the two surfaces due to the weight of the cab at the mount, overcoming friction between the two surfaces, the cab 11 will not have a tendency to center itself as it is lowered onto the mounts. If the angle a is greater than the friction angle, the mount forces will exert stresses which tend to split the cab back structure. The friction angle can be adjusted by varying the smoothness and lubricity of the upper mount surfaces 21 and 23 and the wear pad surfaces 22 and 24.

A workable alternative is a dual-ramp mounting cradle as indicated by the surfaces 32 and 33 of FIG. 9. In this arrangement there is a steep ramp 32 which tends to center the cab 11 and a gentle ramp 33 which supports the cab 11. When, as a result of the truck frame's twisting, the cab mount 18 at the right side of the truck tends to move downward and outboard with respect to the frame 13, generally along the approximate ideal path 29 of FIG. 9, the gentle ramp 33 of the theoretical mounting cradle indicated in FIG. 9 does not permit this precise movement, but rather holds the entire rear of the rigid cab at a greater elevation with respect to the frame than would be the case if the right mount followed the ideal path 29. A consequence of this is that the cab tilts slightly about its front pivots 12. Since the chassis and cab are expressly designed to permit such tilting of the cab about the pivots, the deviation from the theoretically ideal path induced by the dual-ramp system does not induce any stress in the cab other than that caused by the restoring force of the hold-down springs, which will be discussed later. The latch mechanism, of course, must be designed to accommodate the required range of movement.

The motion described may be envisioned with reference to the schematic illustration of FIG. 5, except that the arrows 26 and 27 would be reversed for the situation just described.

This deviation from the ideal path, via the lower ramp 33, causes the left cab mount 18 to be lifted above and clear entirely the left mounting cradle 16. As can be envisioned from FIGS. 9 and 5, ordinarily the tendency of the mounts 18 at right and left to follow their ideal paths would bring about an interference situation at the steep ramp 32 on the uplifting side, i.e. the left side, since this ramp 32 is steeper than the ideal path and is positioned in the apparently desired path of movement of the cab mount 18 at the left.

Figure 7:
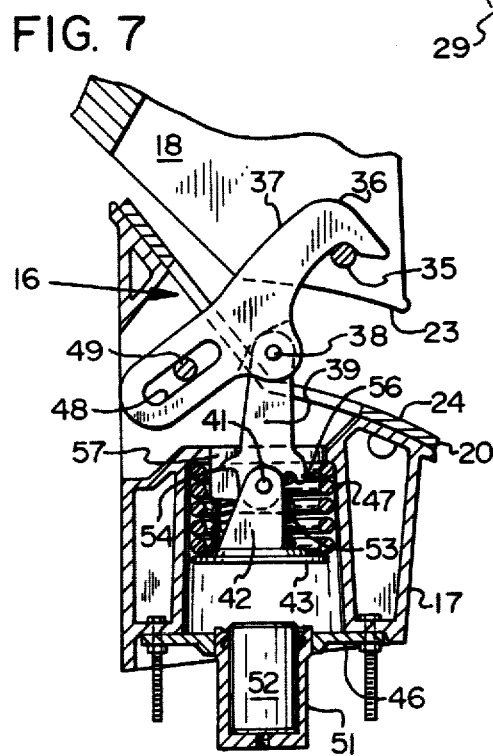
FIG. 7 is another similar view, but showing the opposite movement from FIG. 6.

As indicated in FIG. 9, the deviation of the steep ramp 32 from the approximate ideal path 29 is represented by the angle b. Angle b preferably is large enough to preclude any tendency for the rear of the cab to slide sideways on the rear mounts during lateral acceleration such as cornering. The deviation from the approximate ideal path at the gentle or lower surface 33, indicated by the angle c in FIG. 9, is preferably greater than the deviation angle b, and there is an apparent lifting of the left side of the cab 11 in the situation under consideration. With the angle c greater than the angle b, the tendency is for the uplifting mount 18 to clear the adjacent steep ramp 32 entirely, being out of contact with the ramp 32 while the opposite, downwardly moving cab mount 18 rests on its adjacent lower ramp 33. This situation is further illustrated in FIGS. 6 and 7, wherein FIG. 6 illustrates the approximate motion of the right cab mount 18 in the downward outboard direction, while FIG. 7 illustrates what would occur simultaneously at the left cab mount 18 although the left mount would be opposite hand from what is shown in FIG. 7.

Latching Mechanism

The latch mechanism 14 and its cooperation with the mount system are now described with reference to FIGS. 2–4 and 6–8. The cab mounts 18 each include a mount pin 35 for engagement by the hook end 36 of a hook member 37 associated with the frame-secured mounting cradle 16. As indicated, the cab mount ramp surfaces 21 and 23 are interrupted in the area of the hook member 37, as are the mounting cradle surfaces 22 and 24, so that the hook member 37 can freely move about during frame twisting and so that the cab mount 18 can be lifted clear of the hook member 37 when the latch is released.

As the figures illustrate, the hook member 37 is secured by a pivotal connection 38 to a link 39 below, which is in turn connected by a pivot connection 41 to one or a pair of trunnions 42. The trunnions 42 are fixedly secured to or integral with a trunnion plate 43 which is vertically movable within an inner housing 44 of the mount cradle assembly 16. The trunnion plate 43 is held down in the housing 44 by a partially compressed heavy-duty spring 47 which engages the top portion of the housing 44 as indicated. The trunnion plate is held in close proximity to, but not in contact with, a bottom formed by a cap plate 46. The force of the main spring 47 is transmitted through the link 39 and the hook member 37, and provides the hold-down force on the cab 11.

The hook member 37 has an elongated slot 48 in the end opposite the hook end 36, and this opening is positioned over a slider pin 49 which is rigidly attached to the frame 13 via the mount frame assembly 17. The purpose of this arrangement is to provide a pivot point for some movements of the hook member 37, and a force-receiving point for balancing the force on the cab mount pin 35 and to assure that the force exerted on the cab is essentially and primarily vertical. The slider pin 49 and slotted opening 48 also provide a guide patterning the movement of the hook member 37 when the latch is released, as will be seen below.

There is connected into the cap plate 46 at the bottom of the housing 44 a fluid cylinder 51 having a ram or piston 52 positioned to engage the trunnion plate 43 and push it upwardly, further compressing the main spring 47 to release the latch. In the normal, latched position shown in FIG. 2, there is no pressure in the cylinder 51.

Also included in the latch assembly is a smaller, lighter helper spring 53 also resting on the trunnion plate 43 and positioned eccentrically with respect to a vertical line through the trunnion link pivot point 41, so that the coils of the spring 53 are closer to the pivot point 41 on the side of the pivot point toward the hook end 36 than on the opposite side. The spring coils engage ears 54 and 56 of the link 39. As disclosed in the above-referenced U.S. Pat. No. 3,825,295, this arrangement is effective to exert a biasing moment tending to rotate the link clockwise in the figure and to swing the link in the direction of latching, but in the normal position the much greater force of the main spring 47 prevents any movement from taking place.

There are also provided, connected to the housing 44, one or more risers 57 which extend down into the path of the helper spring 53. This is effective to cancel and reverse the biasing moment on the link 39 when the latch release is activated, as will be seen below.

FIG. 4 illustrates the articulation which occurs when the latching mechanism unlatches and latches. Three positions of the hook member 37 are indicated: the fully latched position, as in FIG. 2 (shown in full in FIG. 4 in dashed lines); a position wherein the latched member has been raised to a small extent by the piston 52, just clear of the cab mount pin 35 (only hook end 36 shown, by the higher set of dashed lines); and the position of full release, shown in solid lines, with the hook-link pivot point 38 fully lifted and the main spring 47 fully compressed, and with the slotted opening 48 of the hook member moved to the maximum permissible extent on the slider pin 49 as indicated. During unlatching, the piston 52 begins compressing the spring 47 and lifting the trunnion plate 43, the link 39 and the hook member 37. In the initial portion of the stroke, the smaller helper spring 53 continues to induce a biasing moment on the link which urges the hook member to the right as viewed in the figures, i.e. in the direction of the cab mount pin 35. With the pressure of the main spring 47 no longer pulling the hook end 36 down on the pin 35, the hook member 37 moves slightly farther to the right in this initial stage of movement, clear of the pin 35.

As the piston 52 continues upward, the left side (as viewed in the figures) of the helper spring 53 engages the risers 57 and prevents further upward movement. This reverses the biasing moment on the link 39, since only the right side of the spring 53 now bears against the link, and the link 39 begins swinging counterclockwise as it continues upward. This causes the hook member 37 to incline backwardly as indicated, more and more steeply until it is in the position shown in solid lines in FIG. 4. In this position, the main spring 47 is fully compressed, coil to coil, the spring 47 being selected so that it will have the desired closed height in this position.

With the hook member 37 fully pivoted and reclined as shown in FIG. 4, the cab 11 may be lifted from the frame 13, since the cab mount 18 will now clear the hook member 37 as the cab 11 is raised and the cab mount 18 separates from the mounting cradle assembly 16. Even if the frame is in a twisted condition when the cab 11 is to be raised, with the cab mount 18 displaced from its normal seated position on the mounting cradle 16, the unlatched position of the hook member 37 is remote from the latch pin 35 and will not re-engage it.

The release cylinders 51 of the cab latching apparatus are preferably connected into the fluid actuated system for lifting the cab 11. Thus, as the operator pumps up pressure in the system, the strength of the main spring 47 in the latching device is such that it will be fully compressed, with the latch fully opened, before pressure builds up sufficiently to begin lifting the cab 11 from the frame 13. This feature is similar to the system described in the above-referenced U.S. Pat. No. 3,825,295, except that a different type of latching mechanism was involved in that system.

Upon the return of the cab 11 to its position on the frame 13, as the cab descends, the progression of the hook member 37 is the reverse of the sequence described above. As soon as the trunnion plate 43 descends to the point that the helper spring 53 loses contact with the risers 57, the helper spring begins exerting a biasing moment tending again to rotate the link 39 clockwise as viewed in FIG. 4, thus urging the hook member 37 to the right and over the latch pin 35, even if the pin 35 is somewhat out of its nominal position due to the frame's being in a twisted condition.

Figure 8:
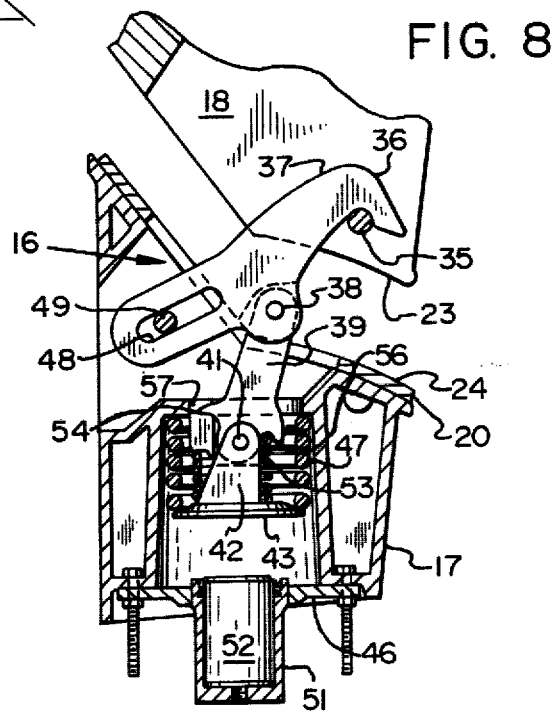
FIG. 8 is another similar view, showing the mount and latch system when the cab rear pulls straight upwardly, as in a head-on collision.

FIGS. 6, 7 and 8 illustrate the action of the latching system as the cab and frame mounting devices undergo relative changes of position. In FIG. 6 the right side cab mount 18 has moved downwardly and to the right with respect to the frame. As these figures illustrate, the shape of the lower ramp surface 24 of the mounting cradle is preferably not planar as discussed in connection with the design ramps 32 and 33 of FIG. 9. Instead, the surface 24 follows a slightly arched, upwardly convex configuration. This is to accommodate the slight rotation (clockwise in FIG. 6) that the cab mount 18 undergoes with respect to the frame 13 during frame twisting. When the cab mount 18 rotates slightly and slides downwardly and outboard with respect to the frame mount assembly 16 the cab mount surface 23 still sits stably on the lower mounting cradle wear pad surface 24, with a broad base of support as illustrated. The mating curved surfaces accommodate any degree of twist under normal circumstances.

Travel of the cab mount 18 with respect to the frame mount assembly 16 is stopped when, as shown in FIG. 6, the slotted opening 48 of the hook member bottoms out against the slider pin 49. The relative movement of the cab and frame are thus limited and not permitted to go beyond this extreme position. Neither the main spring 47 nor the helper spring 53 is particularly active in this situation at this side of the truck.

FIG. 7 shows what occurs during the opposite cab-frame relative movement, which is what occurs simultaneously with that shown in FIG. 6, but on the opposite side of the cab, opposite hand from the figure. The cab mount 18 has moved upward and inboard. No attempt is made under this design to keep the surfaces in contact at the uplifting side of the cab 11. As indicated, the main spring 47 compresses under this condition, and travel of the cab mount 18 is finally stopped when the main spring 47 is compressed coil-to-coil. The main spring force tends to bring the cab back to center position when the frame 13 is untwisted. In the position shown in FIG. 7, the helper spring 53 has contacted the risers 57 and a biasing moment occurs, tending to rotate the link 39 counterclockwise in the figure, but the hook member 37 is being held firmly against the latch pin 35 by the main spring 47, so that no such rotation occurs.

FIG. 8 shows the position of the mounts 18 and 16 when the cab rear is pulled straight up from the frame 13, without twisting, as in a head-on crash situation. The cab mount 18 moves vertically upward until the main spring 53 is coil-to-coil. The behavior of the helper spring 53 is as discussed with reference to FIG. 7.

To those skilled in the art to which this invntion relates, many changes in construction and widely differing embodiments and applications of the invention will suggest themselves without departing from the spirit and scope of the invention. The disclosures and the description herein are purely illustrative and are not intended to be in any sense limiting.

I claim:

1. A rear mounting and latching system for a cab-over-engine truck cab, for enabling relative movement of the cab and the truck frame when the frame twists due to movement of the truck over uneven surfaces, comprising:
    a pair of frame mounts comprising mounting cradles secured to the frame at the rear of the cab, one at each side, each mounting cradle having a first surface steeply inclined downwardly in the outboard direction and an adjacent second surface, extending generally from the lower end of the first surface in the outboard direction, generally sloping downwardly but at less inclination than the first surface;
    a pair of cab mounts secured to the cab, shaped complementarily to the mounting cradles and positioned to engage in the cradles from above and to center the cab rear when the cab is in its normal position on the frame, each mount having a first surface positioned to engage the first surface of the cradle and a second surface positioned to engage the second surface of the cradle; and
    latching means for urging each mount toward its normal position in the mounting cradle while enabling side-to-side, upward, and rocking motion at each cab mount, relative to the frame;
    whereby, upon twisting of the frame, the cab rear can undergo side-to-side and rocking motion with respect to the frame, with the second surface of one mount sliding outboard on the corresponding second surface of the adjacent mounting cradle and the other mount traveling above and inboard of its normal position, out of contact with the adjacent cradle.

2. The mounting and latching system of claim 1 wherein said second surfaces of each cradle and mount are slightly convexly arched, to accommodate the pattern of relative movement of the frame and cab at the mount.

3. The mounting and latching system of claim 1 wherein the latching means comprises:
    a latch pin secured to the cab;
    a latch hook assembly including a hook end positioned to engage the latch pin and including a downwardly extending projection;
    spring means engaging the frame;
    a movable member connected to the spring means so that the movable member is urged downwardly, away from the cab, by the spring means, and including means pivotally mounting the latch hook assembly from the lower end of its projection to the movable member, about a horizontal axis for urging the latch assembly downwardly and for permitting movement of the hook end laterally toward and away from the latch pin;
    release means for pushing the movable member upward and deflecting the spring means, when the cab is to be unlatched from the frame; and
    means for normally urging the hook assembly and hook end laterally toward the latch pin, but for urging them away from and clear of the latch pin when the release means has been activated and the hook assembly is raised to a predetermined degree, so that the cab mount and mounting cradle can be vertically separated.

4. The mounting and latching system of claim 3 wherein the release means comprises a fluid actuated cylinder and piston ram, and wherein the truck includes a fluid actuated cab lifting system into which the fluid actuated cylinders of the mounting and latching system are connected, said spring means being of such strength that it is compressed at least to said predetermined degree before the cab begins to lift from the frame.

5. The mounting and latching system of claim 3 wherein said means for urging the hook assembly and hook end comprises a pair of ears extending outward from the lower end of the projection of the latch hook assembly, one on either side of said horizontal pivot axis of the latch hook assembly, and a helper spring compressed between the movable member and the ears of the latch hook assembly, said helper spring being mounted offset from said horizontal pivot axis, providing a moment whereby one side of the spring urges the hook end laterally toward the latch pin, and stop means secured to the frame and positioned to contact said one side of the offset helper spring when the hook assembly is raised to said predetermined degree, to disengage the one side of the spring from the ear so that the other side then urges the hook end away from and clear of the latch pin.

6. The mounting and latching system of claim 3 wherein the projection of the latch hook assembly includes a link forming a lower portion of the assembly, pivotally connected to the movable member, and a hook member pivotally connected to the upper end of the link and oriented generally horizontally in the latched position, having said hook end and an opposite end with an elongated opening, with a slider pin secured to the frame and extending through the elongated opening, so that the latch hook assembly affords considerable movement of the cab mount while the cab remains latched, and so that the slider pin provides a pivot point and a movement guide for the hook member during relative movement of the mount and mounting cradle and during latching and unlatching.

7. The mounting and latching system of claim 6 wherein said means for urging the hook assembly and hook end comprises a pair of ears extending outward from the lower end of the link, one on either side of said horizontal pivot axis of the link and a helper spring compressed between the movable member and the ears of the link, said helper spring being mounted offset from said horizontal pivot axis, providing a moment whereby one side of the spring urges the link and the hook end of the hook member toward the latch pin, and stop means secured to the frame and positioned to contact said one side of the offset helper spring when the hook assembly is raised to said predetermined degree, to disengage the one side of the spring from the ear so that the other side then urges the hook end away from and clear of the latch pin.

8. The mounting and latching system of claim 1 wherein the latching means comprises, at each side of the truck:
- a latch pin secured to one of the mounts;
- a latch hook assembly including a hook end positioned to engage the latch pin and including a projection extending toward the other end of said mounts;
- spring means engaging the other of said mounts;
- a movable member connected to the spring means so that the movable member is urged away from said one mount, generally toward said other mount by the spring means, and including means pivotally mounting the latch hook assembly from its projection to the movable member about a horizontal axis for urging the latch assembly downwardly and for permitting movement of the hook end laterally toward and away from the latch pin;
- release means for pushing the movable member against the force of the spring means, deflecting the spring means, when the cab is to be unlatched from the frame; and
- means for normally urging the hook assembly and hook end laterally toward the latch pin, but for urging them away from and clear of the latch pin when the release means has been activated and the hook assembly is moved to a predetermined degree toward said one mount, so that the cab mount and mounting cradle can be vertically separated.

9. The mounting and latching system of claim 8 wherein the latch pin is secured to the cab mount, with the spring means, movable member, link and hook member secured to the frame mount.

10. A latching system for securing the rear of a tilt cab to the frame on a cab-over-engine truck having cab and frame mounts engageable with one another on both sides of the truck, comprising:
- a latch pin secured to the one of the mounts;
- a hook member having a hook end positioned to engage the latch pin;
- a link pivotally connected to the hook member about a horizontal axis, and extending toward the other of said mounts;
- spring means engaging said other mounts;
- a movable member connected to the spring means so that the movable member is urged away from said one mount, generally toward said other mount, by the spring means, and including means pivotally mounting the link to the movable member about a horizontal axis for urging the link and hook member downwardly and for enabling swingable movement of the hook end laterally toward and away from the latch pin;
- release means for pushing the movable member against the force of the spring means, deflecting the spring means when the cab is to be unlatched from the frame; and
- means for normally urging the link and hook member laterally toward the latch pin, but for urging them away from and clear of the latch pin when the release means has been activated and the link is moved to a predetermined degree toward said one mount, so that the cab mount and frame mount can be vertically separated.

11. The latching system of claim 10 wherein the release means comprises a fluid actuated cylinder and piston ram, and wherein the truck includes a fluid actuated cab lifting system into which the fluid actuated cylinders of the mounting and latching system are connected, said spring means being of such strength that it is compressed at least to said predetermined degree before the cab begins to lift from the frame.

12. The latching system of claim 10 wherein said means for urging the link and hook member comprises a pair of ears extending outward from the end of the link adjacent the movable member, one on either side of said horizontal pivot axis at the movable member, and a helper spring compressed between the movable member and the ears of the link, said helper spring being mounted offset from said horizontal pivot axis at the movable member, providing a moment whereby one side of the spring urges the link and the hook end toward the latch pin, and stop means secured to the frame and positioned to contact said one side of the offset helper spring when the link is raided to said predetermined degree, to disengage the one side of the spring from the ear so that the other side then urges the link in the other direction, moving the hook end away from and clear of the latch pin.

13. The latching system of claim 10 wherein the latch pin is secured to the cab mount, and the spring means, movable member, link and hook member are secured to the frame mount.

* * * * *